(12) United States Patent
Kramer

(10) Patent No.: US 8,429,711 B2
(45) Date of Patent: *Apr. 23, 2013

(54) SYSTEM AND METHOD FOR EXECUTING INTERACTIVE APPLICATIONS WITH MINIMAL PRIVILEGES

(75) Inventor: Andre Kramer, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 200 days.

This patent is subject to a terminal disclaimer.

(21) Appl. No.: 12/501,667

(22) Filed: Jul. 13, 2009

(65) Prior Publication Data

US 2010/0017857 A1 Jan. 21, 2010

Related U.S. Application Data

(63) Continuation of application No. 10/710,350, filed on Jul. 2, 2004, now Pat. No. 7,587,755.

(51) Int. Cl.
*G06F 17/00* (2006.01)

(52) U.S. Cl.
USPC ........................................ 726/1; 726/4; 726/7

(58) Field of Classification Search ................ 726/1, 4, 726/7; 713/168, 170, 164; 709/227–229; 707/9
See application file for complete search history.

(56) References Cited

U.S. PATENT DOCUMENTS

| | | |
|---|---|---|
| 6,449,652 B1 | 9/2002 | Blumenau et al. |
| 6,993,589 B1 | 1/2006 | Blumenau et al. |
| 7,509,497 B2 | 3/2009 | Joy et al. |
| 7,594,018 B2 * | 9/2009 | Pedersen ...................... 709/227 |
| 2001/0047406 A1 | 11/2001 | Araujo et al. |
| 2003/0046584 A1 | 3/2003 | Laksono |
| 2003/0074580 A1 * | 4/2003 | Knouse et al. ................ 713/201 |
| 2003/0101343 A1 * | 5/2003 | Eaton et al. ................... 713/170 |

OTHER PUBLICATIONS

International Search Report related to PCT/US2005/020171, dated Aug. 25, 2005.

(Continued)

*Primary Examiner* — Samson Lemma
(74) *Attorney, Agent, or Firm* — Foley and Lardner LLP; John D. Lanza

(57) ABSTRACT

A mechanism for running interactive applications with a minimal set of privileges is disclosed. The privileges form a subset of the privileges afforded to the user requesting the application and are allocated consistent with the principle of least privilege. The application runs with the minimal amount of permissions necessary to accomplish its assigned tasks. A new user account is created and provisioned or identified for each application to which a user requests access. The accounts have a subset or superset of the access rights and operating system privileges that the user who is logged on to the system and requesting access to the application ordinarily enjoys. The subset/superset of the user's privileges is determined by a policy-based decision system. The policy-based decision system makes its determination based on an analysis of the application requirements, an analysis of the data security and privacy concerns associated with the execution of the application, the identity of the user and user's role and any other policy considerations previously specified by an administrator. Once the determination as to the appropriate set of privileges to be afforded in the execution environment has been made, the execution environment is created and provisioned or a pre-existing execution environment possessing the requisite privileges is identified and the remote user is logged into the server-side account. The application-specific accounts may be audited by audit trail tools that provide evidence of policy enforcement.

20 Claims, 6 Drawing Sheets

OTHER PUBLICATIONS

Lorch, M, The PRIMA System for Privilege Managements, Authorization and Enforcement in Grid Environments ,IEEE 2003, http://csdl2.computer.org/comp/proceedings/grid/2003/2026/00/20260109.pdf Retrieved date Jun. 25, 2008.

Privilege Control Mechanism for Unix Systems, IBM Technical Disclosure Bulletin, IBM Corp., New York, U.S. vol. 34, No. 7B; Dec. 1, 1991; pp. 477-479.

Publication-Data: IBM Technical Disclosure Bulletin, Dec. 1991, US Administrative Role Configuration with Privilege Control Lists (TDB-ACC-NO) NB9112110 vol. No. 34 pp. 110-113, or See pp. 1-5.

Weber, W., Firewall Basics Telecommunications in Modem Satellite. Cable and Broadcasting Services, 1999. 4r/1 International Conference on NIS, Yugoslavia Oct. 13-15, 1999. Piscataway, NJ, USA. IEEE, US. vol. 1, Oct. 13, 1999. p. 300 -305, XP010359130; ISBN: 0-7803-5768.

Welch V, et al., Security for Grid Services, High Performance Distributed Computing, 2003. Proceedings. 12th IEEE International Symposium on Jun. 22-24, 2003. Piscataway, NJ, USA, IEEE, Jun. 22, 2003; pp. 48-57, XP010643711; ISBN: 0-7695-1965-2.

* cited by examiner

SYSTEM AND METHOD FOR EXECUTING INTERACTIVE APPLICATIONS WITH MINIMAL PRIVILEGES

RELATED APPLICATIONS

This U.S. patent application claims priority to U.S. patent application Ser. No. 10/710,350, filed on Jul. 2, 2004. The disclosure of this prior application is considered part of this disclosure and is herein incorporated by reference in its entirety.

FIELD OF THE INVENTION

The illustrative embodiment of the present invention relates generally to the running of interactive applications in an application-specific execution environment with a determined set of minimal privileges based on criteria determined by a policy-based decision system, and more particularly to the execution of applications with minimal privileges in a distributed application environment.

BACKGROUND OF THE INVENTION

The principle of least privilege is a well-known secure computing aim but is difficult to achieve in practice. An application should run with the minimal set of permissions/privileges required for its tasks. Permissions/privileges for an application include the ability to read, write, and display other data and/or launch other applications and processes. Operating systems typically run applications under the user account of the logged-in user and the user account is forced to trust the application with all of the rights that the user holds regardless of whether or not they are necessary to run the application. The operating system is typically responsible for provisioning user accounts. Provisioning an account includes setting up the rights of the user and verifying the user identity by calling an appropriate credential/identity mapping process. The account provisioning process is usually performed on a per-user basis. That is, the rights and privileges the logged-in user holds are automatically assigned to the requested application. This is a problem for home users who are typically listed as system administrators and for systems administrators, developers and others in a corporate environment who possess broad privileges for at least two reasons.

First, an application which is completely "trusted" ends up with potentially unlimited access to other data and applications (limited only by the extent of the user's privileges). Unlimited access for an application is a problem even in the event that the requested application is not itself per se malicious, as the application may still cause buffer overruns, SQL injections, or be manipulated by hackers who cause intentional problems.

Second, when an application has unlimited access rights, the auditing of events occurring in a system becomes complicated since it is difficult to prove that the application did not perform an action (since the application could have performed the action). Acceptable auditing of the execution environments in which an application is to run is required for banking, medical and other applications requiring secure execution. Conventional methods of limiting access rights of an application such as running the application as a web application (which may need to be re-written) in a common (often unprivileged) operating system account, or using the origin of the code as the basis of deciding if permission is to be granted suffer from an inability to restrict users to their own data or only controlling permissions above the operating system level, respectively.

SUMMARY OF THE INVENTION

The illustrative embodiment of the present invention provides a mechanism for running interactive applications with a minimal set of privileges. The privileges form a subset or superset of the privileges afforded to the user requesting the application and are allocated consistent with the principle of least privilege. The principle of least privilege ensures that an application runs with the minimal amount of permissions necessary to accomplish its assigned tasks. A new user account is created and provisioned or a pre-existing account is identified for each application to which a user requests access. The accounts have a subset/superset of the access rights and operating system privileges that the user who is logged on to the system and requesting access to the application ordinarily enjoys. Server-based applications run in this application-specific execution environment/operating system accounts and display output to users via ICA or RDP.

The subset/superset of the user's privileges (referred to hereafter as "thin privileges") is determined by a policy-based decision system. The policy-based decision system may be implemented as a rule or logic-based system and/or may use scripted agents. The policy-based decision system is used to map a request to run an application to an operating system account created or identified for the application. The policy-based decision system makes its determination of thin privileges based on an analysis of the application requirements, an analysis of the data security and privacy concerns associated with the execution of the application, the identity of the user and user's role and any other policy considerations indicated by an administrator. Once the determination as to the appropriate set of privileges to be afforded to the application in the execution environment has been made, the execution environment is created and provisioned or a pre-existing execution environment possessing the requisite privileges is identified and the remote user is logged into the server-side account. In one aspect of the present invention, the user does not have to provide her username/password as the log-on is automatic. The application specific accounts may be audited by audit trail tools that document the operating system account provisioning and provide evidence of policy enforcement.

In one embodiment, a method provides secure access to applications. The method includes the step of receiving a request from a user to execute an application. The method also includes the step of determining a minimal set of computing privileges necessary for the user to use the requested application. The method for providing secure access to applications further includes the step of invoking an execution environment for the user that enables the application to execute with the determined set of privileges.

In another embodiment, an application server system provides secure access to hosted applications. The system includes a policy based decision system that receives a request from a user to execute an application. The policy based decision system determines a minimal set of privileges required by the user to execute the application. The system further includes an account administration service that is in communication with the policy based decision system. The account administration service invokes or creates an execution environment for the user that has the determined set of minimal privileges.

BRIEF DESCRIPTION OF THE DRAWINGS

These and other aspects of this invention will be readily apparent from the detailed description below and the appended drawings, which are meant to illustrate and not to limit the invention, and in which.

DETAILED DESCRIPTION OF THE DRAWINGS

Figure 1:
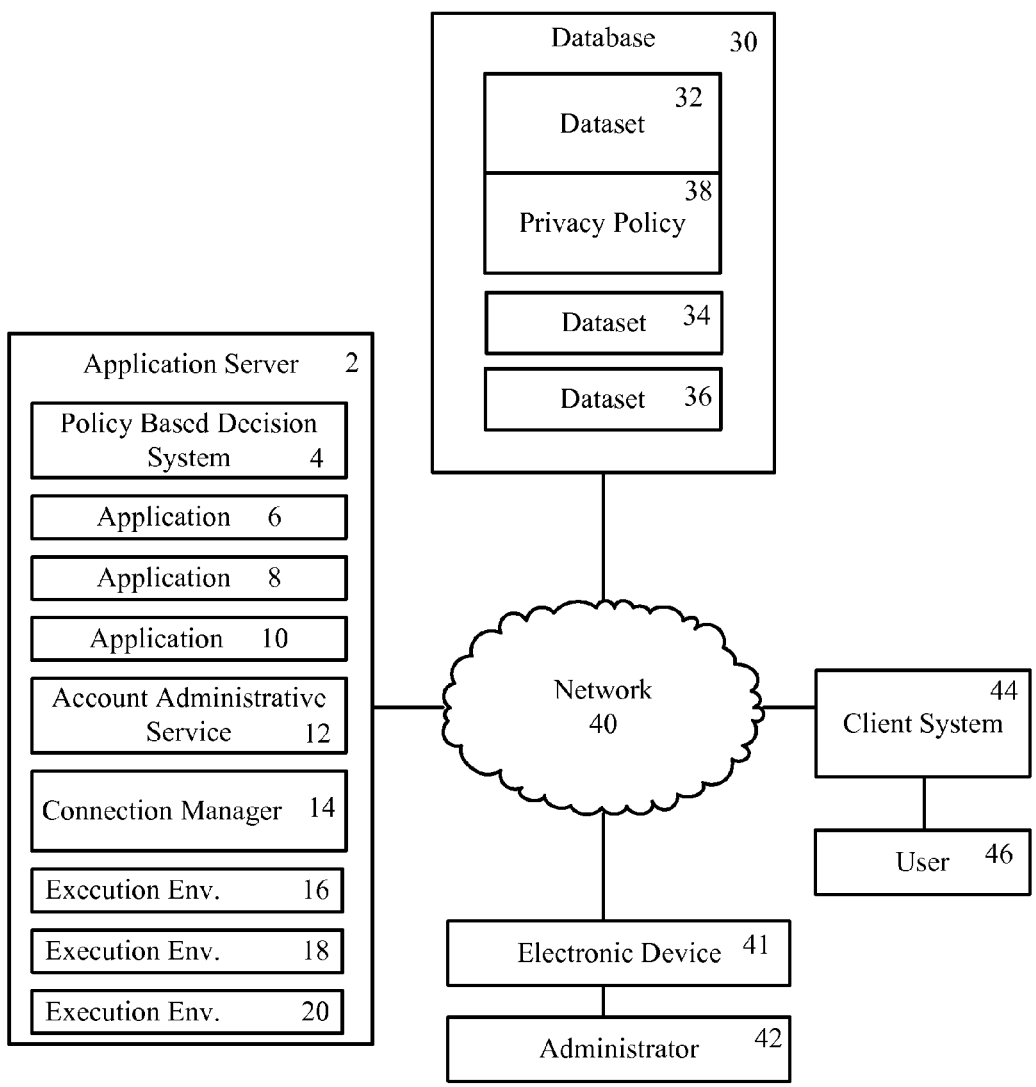
FIG. 1 depicts an environment suitable for practicing the illustrative embodiment of the present invention.

The illustrative embodiment of the present invention provides a mechanism for executing applications while adhering to the principle of least privilege. An application-specific operating system account is created or identified for each application that a user is required to employ securely. The accounts have a subset/superset of the access rights and operating system privileges to which the requesting user is entitled. The subset/superset of access rights or "thin privileges" is based on a number of factors determined by a policy-based decision system. The policy-based decision system may be rule or logic based or employ scripted agents and is used to map a request to run an application to a specially created or identified operating system account. The policy-based decision system analyzes application requirements, data security, and privacy concerns, and any other policy considerations noted by the administrator, and then interacts with the operating system to find or create and provision an operating system account for the application. The policy-based decision system also launches an ICA or RDP application that includes CITRIX PASSWORD MANAGER from Citrix Systems, Inc. of Fort Lauderdale, Fla., or similar credential/identity mapping technology to log the remote user into the specially created or identified server-side account. Alternatively the OS can perform the login automatically. For example, Unix has an "su", superuser command, which allows trusted processes to transition to an arbitrary user account. The special accounts may be audited so as to provide trustable evidence for policy enforcement and verification.

The principle of least privilege and the illustrative embodiment of the present invention are also applicable to a distributed networking environment where a remotely logged in user requests the application. Technologies for providing remote access to networked resources include a variety of client/server software combinations. One of these combinations is often referred to as a "thin-client" system. In these systems, an application is executed by a server computing device, usually referred to as the "application server," on behalf of one or more client computing devices, usually referred to as the "thin-client" or the "thin-client application." Only input to the application received from the user at the thin-client is transmitted from the thin-client to the application server and only output produced by an application executing on the application server is transmitted from the application server to the thin-client. The server side application may also be granted access to other client side resources, such as disks, based on "thin" privilege" principles.

Thin-client computing architectures are popular implementations for providing remote connectivity to applications and other system resources. Examples of such systems include: CITRIX METAFRAME PRESENTATION SERVER software in combination with Intelligent Computing Architecture (ICA) clients, available from Citrix Systems, Inc.; X servers in combination with X Windows clients available from the X Consortium; and Microsoft Windows NT Server 4.0 Terminal Server Edition in combination with Remote Display Protocol (RDP) clients, available from Microsoft Corporation of Redmond, Wash. It is possible to run all the components identified above (Thin-client; ICA protocol; App Server) on one computing device. This provides the advantages of secure application execution using minimal privileged principles to a single system, co-located with the user. The policy decision component can be broken out in order to provide centralized management, for example, for applications deployed on desktop PCs in a corporate environment.

FIG. 1 depicts an environment suitable for practicing the illustrative embodiment of the present invention. An application server 2 and client system 44 are both interfaced with a network 40. The network 40 may be a wide area network (WAN) such as the Internet, a metropolitan area network (MAN), local area network (LAN), an intranet, or some other type of network. The client system 44 may be a thin client. A user 46 accesses the network 40 via the client system 44. An administrator 42 also accesses the network 40 via an electronic device 41. The application server 2 includes a policy based decision system 4, applications 6, 8, 10, an account administrative service 12, a connection manager 14, and execution environments 16, 18, and 20. Although only three execution environments 16, 18 and 20 are shown in FIG. 1, those skilled in the art will recognize that a greater or lesser number of execution environments may also be created on-demand without departing from the scope of the present invention. Similarly, the policy based decision system 4 may be centralized as a secure service shared between application servers or be located at another location accessible to the application server 2 without departing the scope of the present invention.

The policy based decision system 4 determines the minimal set of privileges required by the user to execute the application 6, 8 and 10 requested by the user. The account administration service 12 contacts the policy based decision system 4 and invokes the execution environment 16, 18 and 20 for the user which have the determined set of thin privileges being afforded to the applications. The invoked execution environments 16, 18 and 20 may be created and provisioned consistent with the determined set of thin privileges afforded the application or may be identified as an existing execution environment suitable for the application. In one implementation of the present invention, each application gets put into one and only one execution environment. In another implementation, multiple applications can share the same execution environment. Applications 6, 8, and 10 are programs that may be requested by the user 46. The connection manager 14 is also in communication with the policy based decision system 4 and transmits to the policy based decision system an identification of the user 46 requesting a particular application.

The application server 2 also has access to a database 30. The database 30 has datasets 32, 34, and 36 that may be required by the requested application 6, 8, and 10. The datasets 32, 34, and 36 may have an individual confidentiality policy associated with the dataset such as the confidentiality policy 38 associated with dataset 32. Any confidentiality policies associated with the datasets 32, 34 and 36 may be utilized by the policy based decision system 4 in determining the privileges afforded to the application during execution.

Still referring to FIG. 1 and in more detail, the policy-based decision system 4 enforces the principle of least privilege by enforcing a companies or third party's confidentiality policies. The policy based decision system 4 is responsible for determining the "thin privileges that will be afforded to the application during execution. These thin privileges form a subset/superset of the privileges afforded to the logged in user requesting the execution of the application. In most situations, the privileges are the same as the user's privileges or a more restricted set of privileges. Those skilled in the art will recognize that if the requested application requires more extensive privileges than the requesting user possesses in order to run, the application will not be executed unless the policy based decision system 4 authorizes a superset of the user's privileges. The type of privileges afforded to the requested application restrict what the application can do for the user. Applications 6, 8 and 10 are given access only to those resources necessary for the application to function properly, such as the datasets 32, 34 and 36. For example, a word processing application may require read and write access to the file system. Another application may require a user to be able to sign a document electronically or view only a particular dataset. Additional privileges that may be restricted include network access and IPC/RPC or shared memory. The ability to load and run code libraries may also be restricted as may access to the I/O resources depicted in FIGS. 2A and 2B. Similarly, the ability to make system calls and requests to other applications and services/servers are also important privileges to control. Multiple different types of applications 6, 8 and 10 may be used by the present invention such as a word processing application such as WORD from Microsoft Corporation of Redmond, Wash., or a spreadsheet application such as EXCEL also from Microsoft.

The database 30 in FIG. 1 may be an SQL database, ACCESS database, ORACLE 9i database, flat file, relational database, multi-dimensional or some other type of database, or file system, disk or tape storage or shared memory. An individual confidentiality policy 38 may be may be specifically tailored for one of the datasets 32, 34 and 36. The individual confidentiality policy 38 for example may allow a dataset 32 to be read by a spreadsheet application but not written to by the spreadsheet application. The network 40 may be a wireless network, satellite network, optical network, a hybrid network, or some other type of network. The application server 2 may connect to the network 40 through a variety of connections including standard telephone lines, LAN or WAN links (e.g., T1, T3, 56 kb, X.25), broadband connections (ISDN, Frame Relay, ATM), and wireless connections. Connections between the application server 2 and the client system 44 may use a variety of data-link layer communication protocols (e.g., TCP/IP, IPX, SPX, NetBIOS, NetBEUI, SMB, Ethernet, ARC-NET, SSL/TLS, HTTP, HTTPS, Fiber Distributed Data Interface (FDDI), RS232, IEEE 802.11, IEEE 802.11a, IEEE 802.11b, IEEE 802.11g and direct asynchronous connections).

Figure 2A:
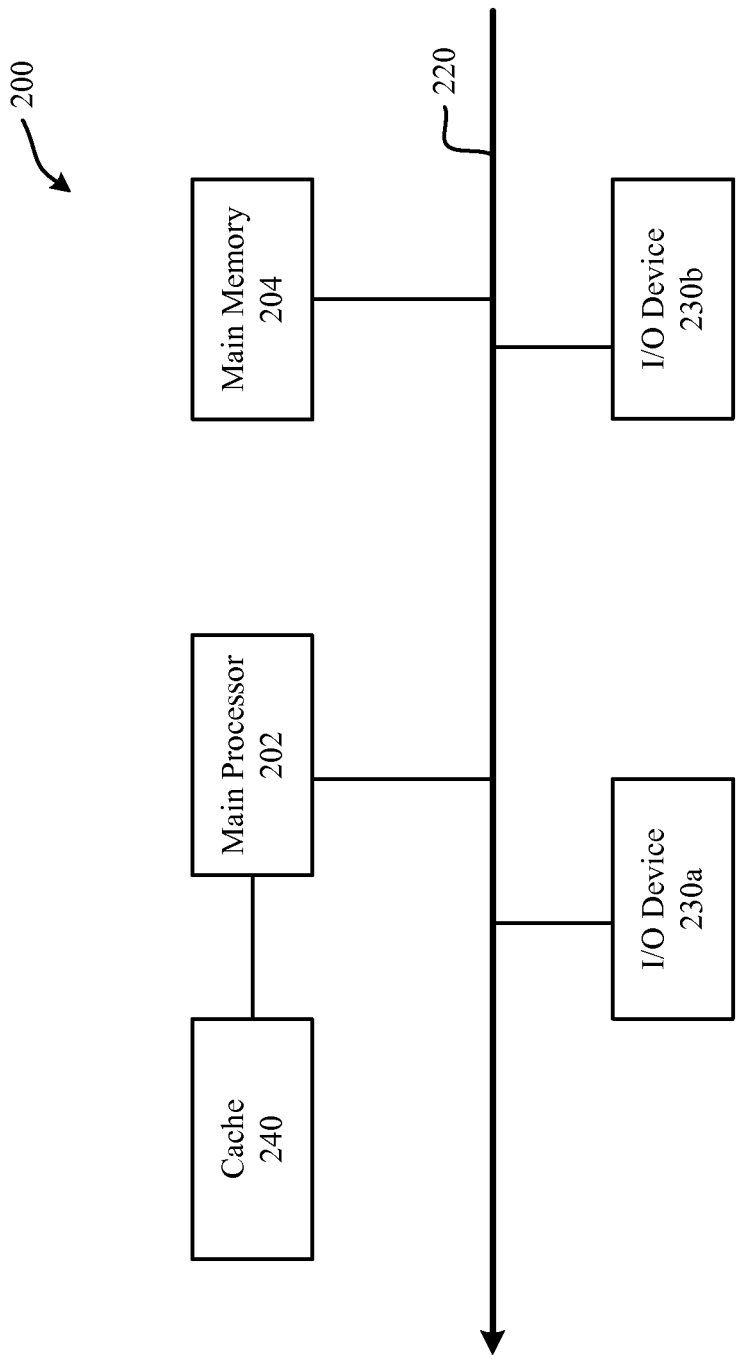
FIG. 2A is a block diagram depicting a typical computer useful in the present invention.
Figure 2B:
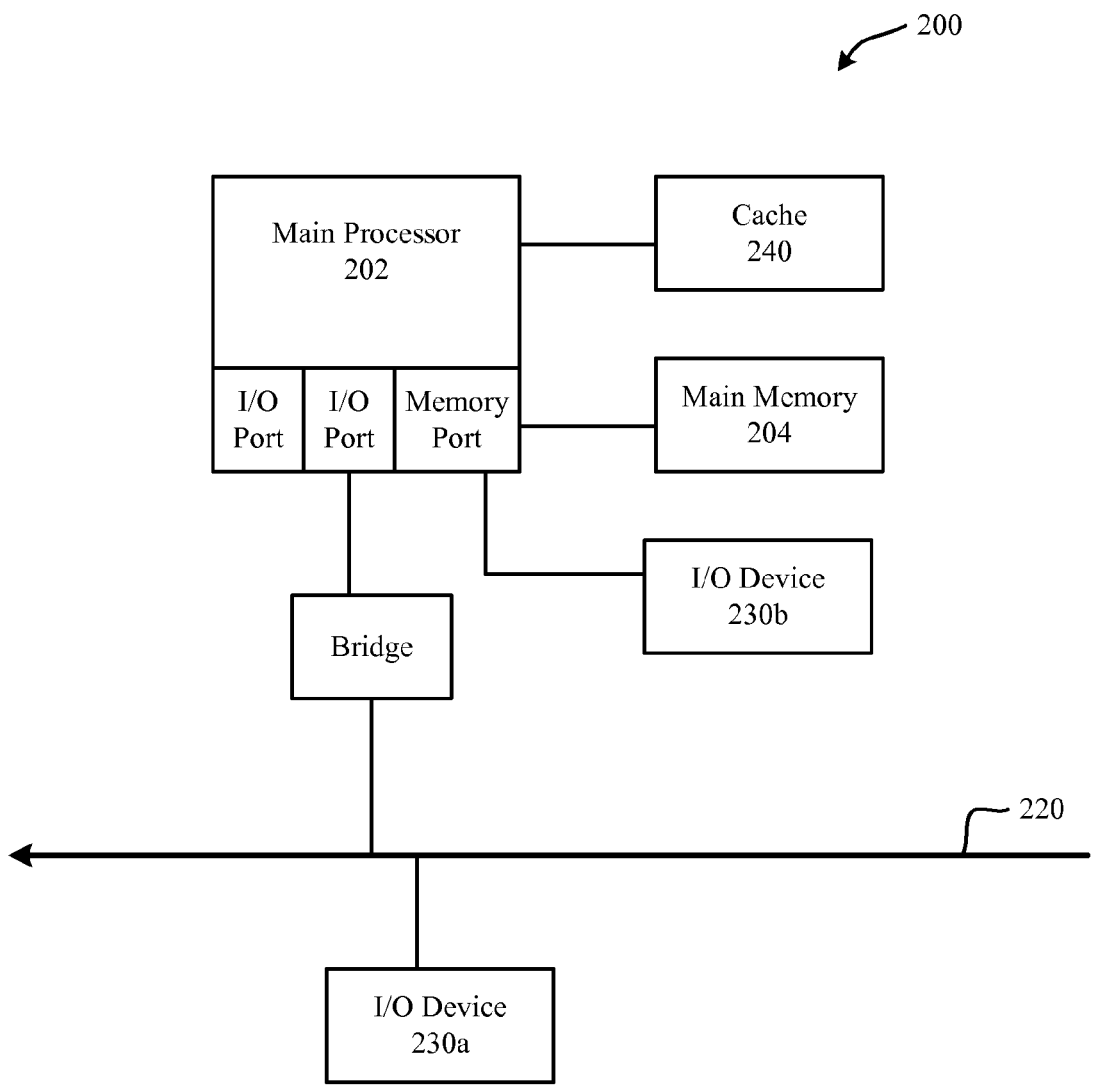
FIG. 2B depicts an embodiment of the computer system in which the processor communicates directly with main memory via a memory port.

The client system 44 which is used by the user 46 to access the network may be a desktop system, workstation, or laptop. Alternatively, the client system 44 may be a thin client such as a PDA or cellular phone with network connectivity. FIGS. 2A and 2B depict block diagrams of a typical computer 200 useful in the present invention. As shown in FIGS. 2A and 2B, each computer 200 includes a central processing unit 202, and a main memory unit 204. Each computer 200 may also include other optional elements, such as one or more input/output devices 230a-230n (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as: the 8088, the 80286, the 80386, the 80486, the Pentium, Pentium Pro, the Pentium II, the Celeron, or the Xeon processor, all of which are manufactured by Intel Corporation of Mountain View, Calif.; the 68000, the 68010, the 68020, the 68030, the 68040, the PowerPC 601, the PowerPC604, the PowerPC604e, the MPC603e, the MPC603ei, the MPC603ev, the MPC603r, the MPC603p, the MPC740, the MPC745, the MPC750, the MPC755, the MPC7400, the MPC7410, the MPC7441, the MPC7445, the MPC7447, the MPC7450, the MPC7451, the MPC7455, the MPC7457 processor, all of which are manufactured by Motorola Corporation of Schaumburg, Ill.; the Crusoe TM5800, the Crusoe TM5600, the Crusoe TM5500, the Crusoe TM5400, the Efficeon TM8600, the Efficeon TM8300, or the Efficeon TM8620 processor, manufactured by Transmeta Corporation of Santa Clara, Calif.; the RS/6000 processor, the RS64, the RS 64 II, the P2SC, the POWER3, the RS64 III, the POWER3-II, the RS 64 IV, the POWER4, the POWER4+, the POWER5, or the POWER6 processor, all of which are manufactured by International Business Machines of White Plains, N.Y.; or the AMD Opteron, the AMD Athalon 64 FX, the AMD Athalon, or the AMD Duron processor, manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 2A, the processor 202 communicates with main memory 204 via a system bus 220 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 220. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200 in which the main processor 202 communicates directly with I/O device 230b via Hyper-Transport, Rapid I/O, or InfiniBand. FIG. 2B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 200 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose desktop computers of the sort depicted in FIGS. 2A and 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

Those skilled in the art will recognize that the illustrative embodiment of the present invention may be use a number of different types of architectures and that the modules depicted in FIG. 1 may be combined in a different manner without departing from the scope of the present invention. For example, the separately shown policy based decision system 4, account administrative service 12 and connection manager 14 may be combined into a single executable software module.

Figure 3:
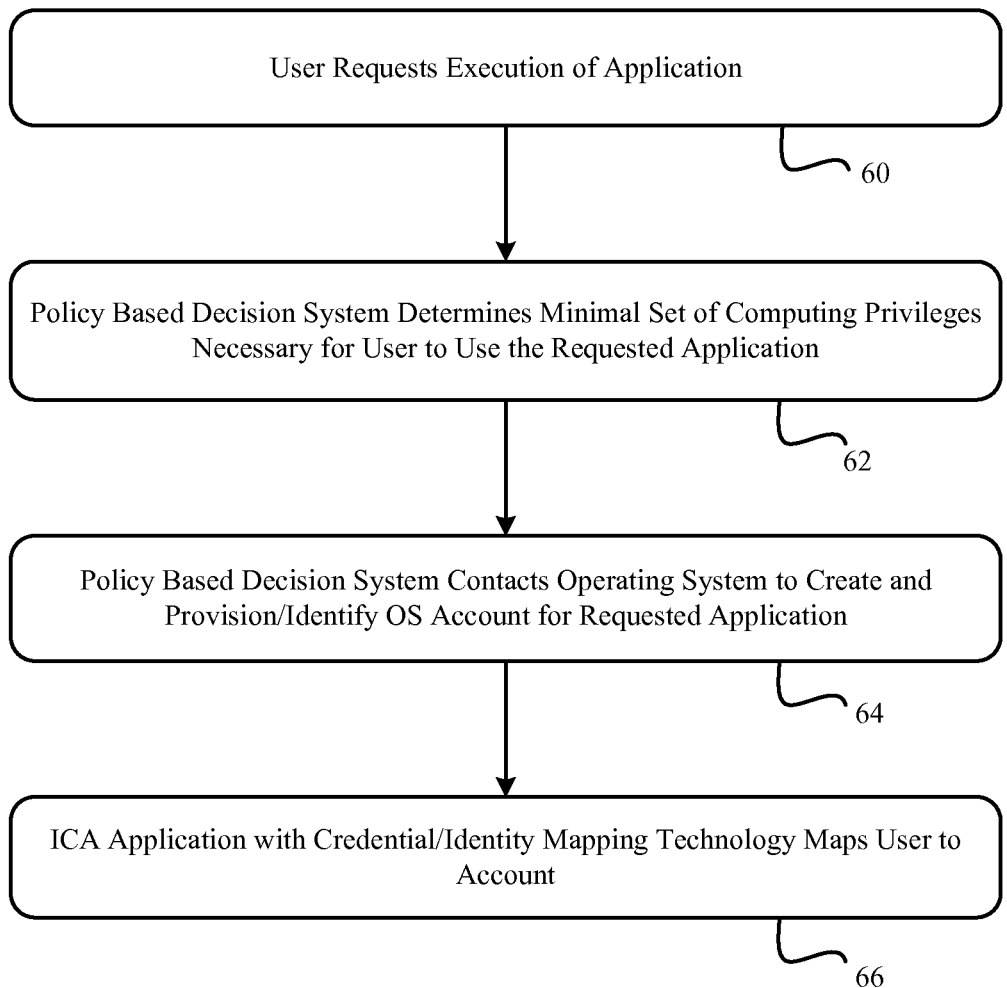
FIG. 3 is a flow chart of the sequence of steps followed by the illustrative embodiment of the present invention to create application-specific execution environments based on thin privileges of the application.

The sequence by which the policy based decision system 4 determines the "thin privileges" for the requested application is depicted in FIG. 3. The sequence of steps begins when the user requests execution of an application 6, 8, and 10 on the application server 2 (step 60). The request may be a HTTP-based request. Alternatively, the request may be an FTP request or Telnet request or proprietary protocol (such as ICA or RDP). The policy-based decision system 4 then determines the minimal set of computing privileges necessary for the user to use the requested application (i.e.: the thin privileges) (step 62). The mechanics of the policy-based decision system 4 determining the thin privileges afforded to the application are discussed in further detail below. The policy-based decision system 4 then contacts the operating system to create and provision an operating system account (also referred to herein as the execution environment 16, 18 and 20 depicted in FIG. 1) specifically for the requested application that will have the determined set of privileges during the application execution (step 64). An ICA or RDP-based application such as CITRIX PASSWORD MANAGER from Citrix Systems, Inc., is then launched which contains credential/identity mapping technology (step 66) to map the user to the created/identified execution environment. The credentials may be supplied by the operating system. METAFRAME from Citrix Systems, Inc. and WINDOWS TERMINAL SERVICES from Microsoft Corporation may be used in this step.

Figure 4:
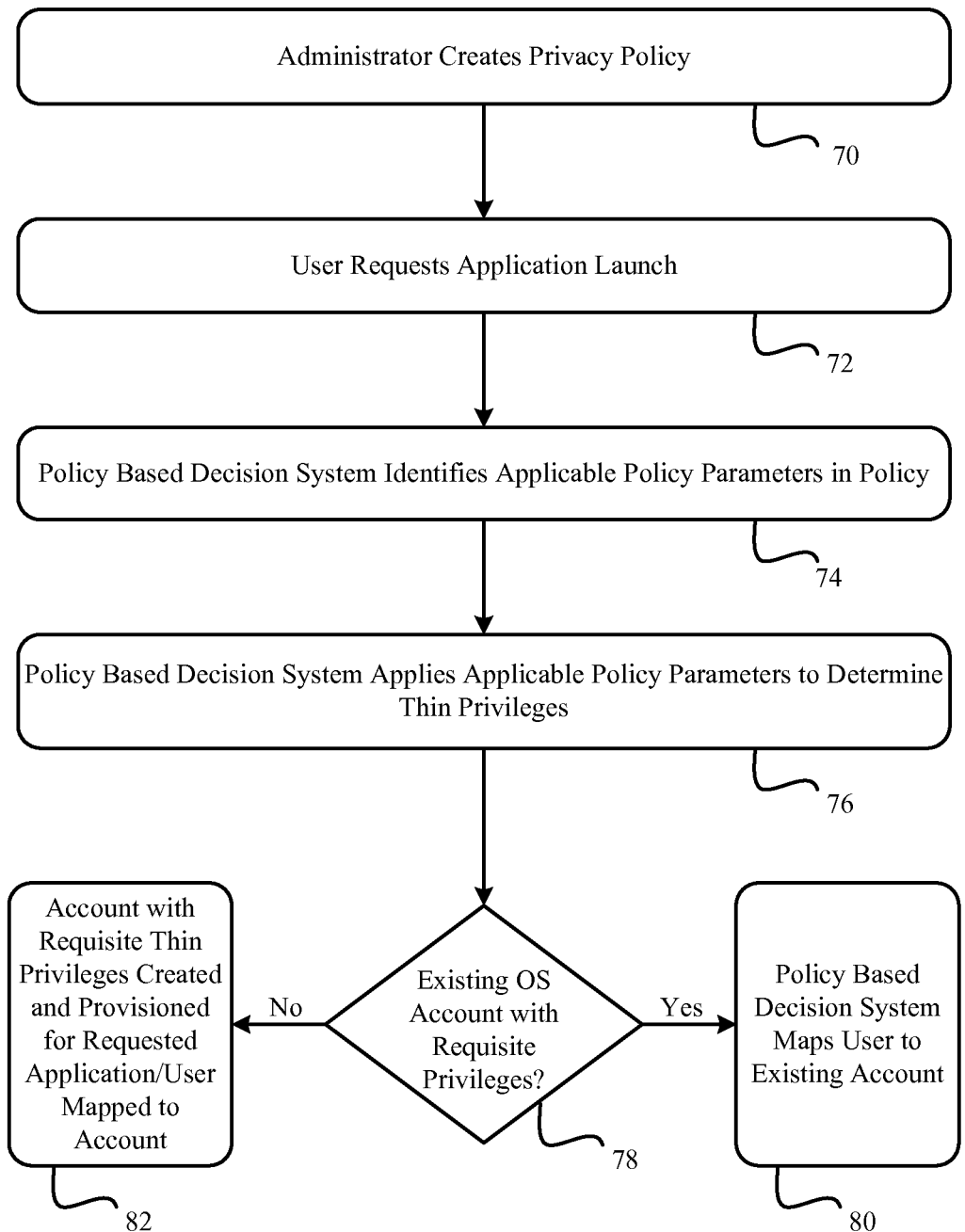
FIG. 4 is a flow chart of the sequence of steps followed by the illustrative embodiment of the present invention to utilize the policy-based decision system.

FIG. 4 depicts the sequence of steps followed by the illustrative embodiment of the present invention to apply a security policy to the "thin privileges" determination. The sequence begins when the administrator creates a confidentiality policy enforced by the policy based decision system 4 (step 70). The policy-based decision system 4 may be implemented via scripted agents. The scripted agents are programmable logic, written in Java/JavaScript or C/C++/C# or similar programming languages. Programmable logic is needed if the decision needs to be computed from a variety of inputs (time of day, location of user) in a complex manner (e.g. charge user's credit card). The policy-based decision system 4 may also be rule or logic based. The policy-based decision system 4 enforces policies set by the administrator 42 for the application 6, 8, and 10. The policy-based decision system 4 applies a wide variety of parameters to the process of mapping user requested applications to a created/identified execution environment. Subsequently to the creation of the policy, the user 46 requests the execution of an application 6, 8, and 10 (step 72) and the policy-based decision system 4 determines the applicable policy parameters (step 74) as is discussed further in FIG. 5 below. After the policy-based decision system 4 identifies the applicable policy parameters in the policy (step 74) the applicable policy parameters are applied in light of the request context taking into account any dynamic factors to determine the thin privileges needed (step 76). The policy-based decision system then determines whether an account already exists with the requisite thin privileges (step 78). The user is then mapped to the identified existing account (step 80) or mapped to a newly created account with the requisite thin privileges (step 82).

The policy-based decision system 4 is able to utilize a wide variety of policy parameters. For example, the parameters may specify that a word processing application should only have access to create and read/write files in a "doctor's prescriptions" file if the user is a medical practitioner at a hospital and the word processing application is being used to prescribe medication during a patient session. Similarly, the parameters may specify that an expense report application should not be able to change source code files simply based on the identity of a user as a software developer. However, during, a code review, the parameters may specify that the developer is able to read source code and make separate notes (in another file) but not make changes (maliciously introduce bugs or back doors). Likewise, the parameters may specify that during office hours, any Web browser started can only make connections to web servers on the Intranet. The parameters may further allow the user under such a constraint to explicitly request that the browsing is done without file access privileges at all (except for some temporary files for Web caching and read-only browser configuration). Those skilled in the art will recognize that many additional types of parameters in addition to those listed herein may be utilized by the policy-based decision system 4 without departing from the scope of the present invention.

Figure 5:
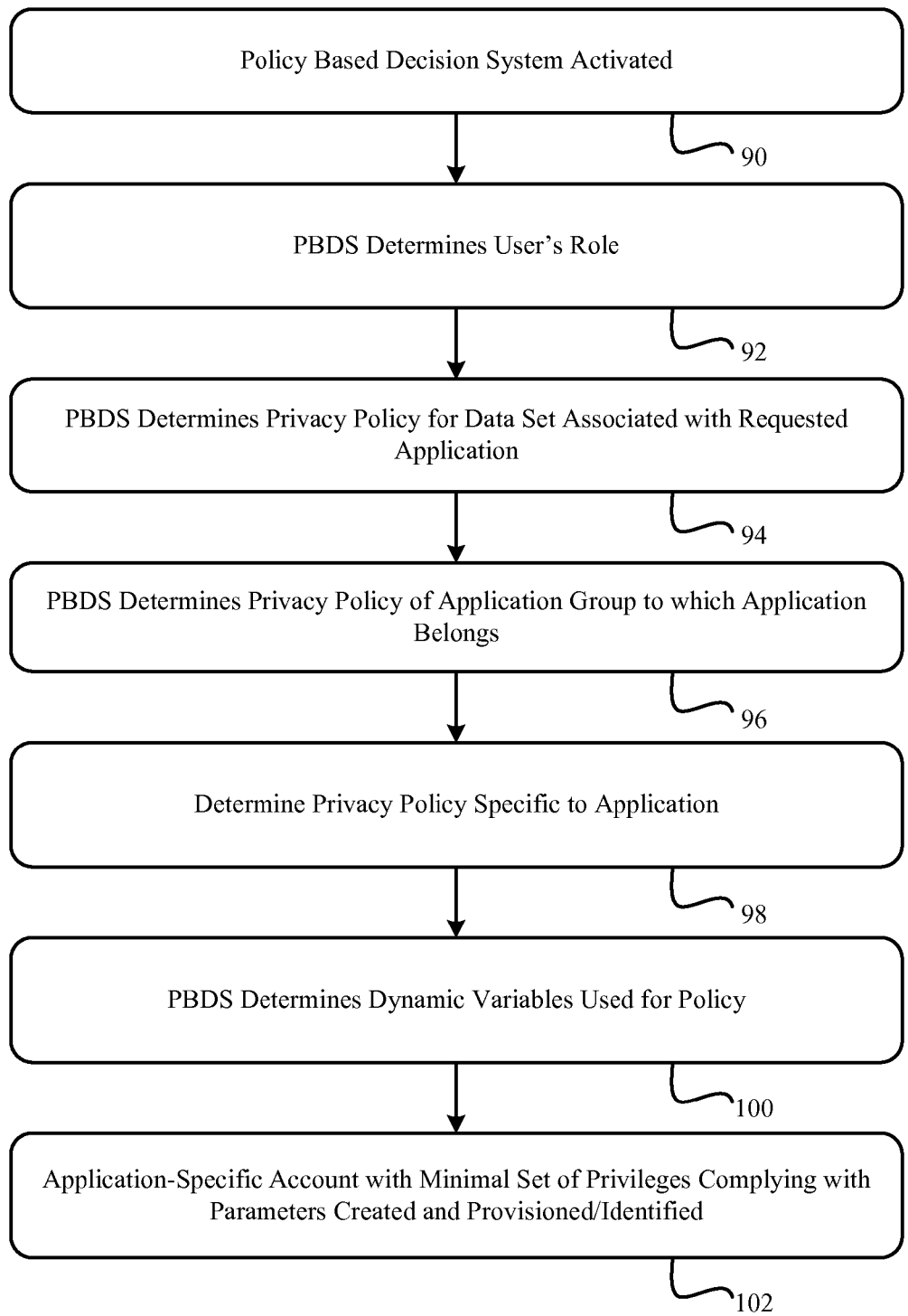
FIG. 5 is a flow chart of the sequence of steps followed by the illustrative embodiment of the present invention to apply a variety of policy parameters in creating/identifying application-specific execution environments.

FIG. 5 depicts in more detail some of the factors considered by the policy-based decision system 4 in mapping the requested application to the proper execution environment. Parameters may be dynamic such as the time of day or date and are evaluated at run-time by the policy based decision system 4. The sequence of steps begins when the policy-based decision system 4 is activated. As previously stated the policy-based decision system may involve the execution of scripts performing various actions, and declarations and statements testing for various conditions (step 90). The policy-based decision system may involve tailoring the privileges provided to the requested application based upon the requesting user's role (step 92). For example, the amount of privileges afforded to the application may depend upon whether the user is a system operator or administrator. For example, a developer requesting an application may be afforded write privileges for the application with regard to a dataset whereas another user whose only need is to review data may be afforded only read privileges for the requested application. The policy-based decision system 4 may identify or provision a created account based on the dataset associated with the requested application (step 94). For example, if an application needs to access a particular set of data that is of a particularly confidential nature, the type of privileges granted to the application may be restricted more than in other cases where the dataset is not so important. Similarly, the policy-based decision system 4 may allocate the privileges afforded to the requested allocation based on the application group to which the requested application belongs (step 96). For example, the type of application may control the privileges afforded to the application as per a previously set confidentiality policy. Additionally, the policy-based decision system 4 may determine specific parameters associated with an individual application (step 98). Also, dynamic variables such as the time of day and the number of users requesting an application simultaneously may be used by the determination process for allocating privileges to the application (step 100). As an example, a game application requested by a user may be permissibly executed after working hours but not during the workday. Following application of the various policy parameters, the policy-based decision system 4 arranges the mapping of the requested application to a created or identified operating system account/execution environment which is provisioned with the appropriate privileges for the application (step 102). In this manner, the applications are not blindly given the same set of user privileges afforded to the user at login.

Those skilled in the art will recognize that many additional parameters may be identified and/or determined by the policy-based decision system 4 in the process of mapping the requested application to an identified/created account appropriate for the "thin privileges" afforded to the application. A different session is established for each application requested by users. Multiple sessions may be established for a single user at the same time. The illustrative embodiment of the present invention supports single sign on techniques where the user's login information may be relied upon to map the user into each of the unique execution environments without re-entry of the login information. Each unique execution environment supports the execution of an application with its own set of thin privileges. A unique ID referring to the execution environment is returned to the client system. The client system may use the unique ID in the presentation level protocol communications with the application server and the execution environment for the application.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrative flowcharts are examples and not the exclusive sequence of steps possible within the scope of the present invention. Similarly, data structures other than the ones mentioned herein may be used to hold data without departing from the scope of the present invention.

What is claimed is:

1. A method for providing secure access to applications, the method comprising the steps of:
 (a) receiving from a client system, by a server, a request from a user to execute an application;
 (b) identifying, by a policy system executing on the server and responsive to receiving the request, a role of the user;
 (c) determining, by the policy system, a first policy for a data set associated with the requested application;
 (d) determining, by the policy system, a second policy of an application group associated with the requested application;
 (e) determining, by the policy system, a third policy specific to the requested application;
 (f) contacting, by the policy system, an account administrative service to create and provision an execution environment for the requested application comprising a minimal set of computing privileges; and
 (g) invoking, by the account administrative service, an execution environment executing on the server, for the user, having the determined set of minimal privileges.

2. The method of claim 1, further comprising returning an identifier for the execution environment to the requesting user.

3. The method of claim 1, further comprising connecting, via a remote presentation protocol, the user to the execution environment.

4. The method of claim 3, further comprising connecting the user, responsive to an identifier received from the requesting user identifying the execution environment.

5. The method of claim 1, wherein step (e) further comprises analyzing requirements of an application to determine a minimal set of privileges necessary for the user to use the requested application.

6. The method of claim 1, further comprising receiving an indication of a dataset on which the application operates.

7. The method of claim 6, wherein step (c) further comprises accessing a confidentiality policy associated with the identified dataset to determine a minimal set of computing privileges necessary for the user to use the requested application.

8. The method of claim 1, wherein step (b) further comprises determining a minimal set of computing privileges necessary for the user to use the requested application based on a role assigned to the user.

9. The method of claim 1, wherein step (g) further comprises identifying a previously-existing execution environment for the user having the determined set of privileges.

10. The method of claim 1, further comprising:
receiving a request to execute a second application,
determining a minimal set of computing privileges necessary for the user to use the second requested application; and
invoking a second execution environment, for the user, having the second determined set of privileges.

11. An application server system providing secure access to hosted applications, the system comprising:
a policy based decision system receiving a request from a user to execute an application and determining a minimal set of privileges required by the user to execute the application identifying a role of the user, determining a first policy for a data set associated with the requested resource, determining a second policy of an application group associated with the requested application, determining a third policy specific to the requested application, and contacting an account administrative service to create and provision an execution environment for the requested application comprising a minimal set of computing privileges; and
an account administration service in communication with said policy based decision system, the account administration service invoking an execution environment for the user having the determined set of privileges.

12. The system of claim 11, further comprising a connection manager in communication with said policy based decision system, said connection manager receiving from a client system a request by the user to execute the application and transmitting to said policy based decision system an identification of said user and an identification of said application.

13. The system of claim 11, further comprising returning, by the account administration service, an identifier for the execution environment to the user; and connecting the user to the execution environment, responsive to receiving a request from the user including the identifier.

14. The system of claim 11, wherein said connection manager transmits an identification of the user's role to said policy based decision system.

15. The system of claim 11, wherein said policy-based decision system analyzes a set of requirements of the requested application to determine a minimal set of privileges required by the user to execute the requested application.

16. The system of claim 11, wherein said connection manager receives an identification of a dataset that the application will process.

17. The system of claim 16, wherein said policy based decision system accesses a confidentiality policy associated with the identified dataset to determine a minimal set of privileges required by the user to execute the application.

18. The system of claim 11, wherein said account administration service creates an execution environment having the determined minimal set of privileges.

19. The system of claim 11, wherein said account administration service identifies a previously-existing execution environment having the determined minimal set of privileges.

20. The system of claim 11, wherein the policy-based decision system determines the minimal set of privileges required by the user to execute the application in response to the request.

* * * * *